(12) United States Patent
Griffin et al.

(10) Patent No.: US 7,035,486 B2
(45) Date of Patent: Apr. 25, 2006

(54) PHOTONIC INTEGRATED DEVICE

(75) Inventors: Robert Griffin, Northants (GB); Robert Graham Walker, Northampton (GB); Robert Ian Johnstone, Northants (GB)

(73) Assignee: Bookham Technology, PLC, Northamptonshire (GB)

( * ) Notice: Subject to any disclaimer, the term of this patent is extended or adjusted under 35 U.S.C. 154(b) by 55 days.

(21) Appl. No.: 10/497,470

(22) PCT Filed: Nov. 29, 2002

(86) PCT No.: PCT/GB02/05390

§ 371 (c)(1),
(2), (4) Date: Jun. 1, 2004

(87) PCT Pub. No.: WO03/049332

PCT Pub. Date: Jun. 12, 2003

(65) Prior Publication Data

US 2005/0069240 A1    Mar. 31, 2005

(30) Foreign Application Priority Data

Nov. 30, 2001   (GB) ................................ 0128785

(51) Int. Cl.
*G02F 1/035* (2006.01)
*H04B 10/12* (2006.01)

(52) U.S. Cl. .................... 385/3; 385/1; 385/2; 385/14; 385/129; 385/130; 398/188

(58) Field of Classification Search ............... 385/1, 385/2, 3, 14, 15, 16, 40, 129, 130, 131
See application file for complete search history.

(56) References Cited

U.S. PATENT DOCUMENTS

| | | | |
|---|---|---|---|
| 4,716,559 A | 12/1987 | Hine | 385/14 X |
| 4,893,352 A * | 1/1990 | Welford | 398/198 |
| 5,069,517 A | 12/1991 | Kersten et al. | 385/130 |
| 5,325,388 A | 6/1994 | Gupta et al. | 372/50 |
| 5,566,381 A * | 10/1996 | Korotky | 398/147 |

(Continued)

FOREIGN PATENT DOCUMENTS

EP    0 496 298 A2    7/1992    ............ 385/14 X (Continued)

OTHER PUBLICATIONS

Haga H. et al.: "LiNbO$_3$ Traveling-wave light modulator/switch with an etched groove"; IEEE Journal of Quantum Electronics, vol. QE22, No. 6, Jun. 1986, pp. 902-906, XP009007591, p. 903; figure 1.

(Continued)

*Primary Examiner*—Brian M. Healy
(74) *Attorney, Agent, or Firm*—Lahive & Cockfield, LLP; Anthony A. Laurentano, Esq.

(57) ABSTRACT

A photonic integrated device having a substrate layer, epitaxial layers formed on said substrate layer and a guiding layer formed by one of the epitaxial layers. An optical waveguide is formed within the guiding layer. In the waveguide are a splitter (4) having at least two outputs, each output being transmitted to a Mach-Zehnder modulator (6, 8), the phase of the output of at least one modulator being shiftable, the signals being recombined to provide an optical phase shift key (PSK) output (14) wherein a trench is etched into the substrate layer between each pair of modulators to isolate the modulators from one another.

9 Claims, 3 Drawing Sheets

U.S. PATENT DOCUMENTS

| | | | |
|---|---|---|---|
| 5,644,664 A * | 7/1997 | Burns et al. | 385/2 |
| 5,694,504 A | 12/1997 | Yu et al. | 385/45 |
| 5,949,926 A * | 9/1999 | Davies | 385/3 |
| 5,999,300 A * | 12/1999 | Davies et al. | 398/185 |
| 6,456,750 B1 * | 9/2002 | Price et al. | 385/2 |
| 6,798,557 B1 * | 9/2004 | Leven | 359/279 |
| 2003/0138181 A1 * | 7/2003 | Davies | 385/3 |
| 2004/0028418 A1 * | 2/2004 | Kaplan et al. | 398/188 |
| 2004/0141691 A1 * | 7/2004 | Wiesmann et al. | 385/40 |
| 2005/0111855 A1 * | 5/2005 | Bissessur | 398/188 |
| 2005/0117191 A1 * | 6/2005 | Griffin | 359/245 |

FOREIGN PATENT DOCUMENTS

| | | | |
|---|---|---|---|
| EP | 1 041 424 A2 | 10/2000 | 385/14 X |
| JP | 05-107568 | 4/1993 | 385/14 X |

OTHER PUBLICATIONS

Cormack, I.G. et al.: "Practical measurement of femtosecond optical pulses using time-resolved optical gating", Optics Communications, North-Holland Publishing Co. Amsterdam, NL, vol. 194, No. 4-6, Jul. 15, 2001, pp. 415-424 XP004306783, ISSN: 0030-4018.

\* cited by examiner

PHOTONIC INTEGRATED DEVICE

RELATED APPLICATIONS

This application is a 35 U.S.C. 371 national stage filing of International Application No. PCT/GB02/05390, filed 29 Nov. 2002, which claims priority to Great Britain Patent Application No. 0128785.3 filed on 30 Nov. 2001, in Great Britain. The contents of the aforementioned applications are hereby incorporated by reference.

BACKGROUND OF THE INVENTION

The invention relates to a photonic integrated device for modulating an optical signal in a wavelength division multiplex (WDM) optical communications system.

In this specification the term "light" will be used in the sense that it is used generically in optical systems to mean not just visible light but also electromagnetic radiation having a wavelength between 800 nanometres (nm) and 3000 nm. Currently the principal optical communication wavelength bands are centred on 1300 nm, 1550 nm (C-Band) and 1590 nm (L-Band), with the latter bands receiving the majority of attention for commercial exploitation.

Exemplary WDM systems operating in the 1550 nm C-Band optical fibre communication band are located in the infrared spectrum with International Telecommunication Union (ITU) 200, 100 or 50 GHz channel spacing (the so called ITU Grid) spread between 191 THz and 197 THz.

With ongoing developments in optically amplified dense wavelength division multiplex (DWDM) optical links as the backbone of point-to-point information transmission and the simultaneous increase in bit rate applied to each wavelength and the simultaneous increase in the number of channels, the finite width of the erbium gain window of conventional erbium-doped optical amplifiers (EDFAs) could become a significant obstacle to further increases in capacity. Conventional EDFAs have a 35 nm gain bandwidth which corresponds to a spectral width of 4.4 THz. System demonstrations of several Tbit/s data rate are already a reality and the spectral efficiency, characterised by the value of bit/s/Hz transmitted, is becoming an important consideration. Currently, high-speed optical transmission mainly employs binary amplitude keying, using either non-return-to-zero (NRZ) or return-to-zero (RZ) signalling formats, in which data is transmitted in the form of binary optical pulses, i.e. on or off.

In WDM several factors limit the minimum channel spacing for binary amplitude signalling, and in practice spectral efficiency is limited to ~0.3 bit/s/Hz. Although increasing the per-channel bit rate tends to reduce system equipment, there are several problems that need to be overcome for transmission at bit rates above 10 Gbit/s; these being:

- dispersion management of the optical fibre links, this becomes increasingly difficult with increased bit rate;
- Polarisation mode dispersion (PMD) in the optical fibre causes increased signal degradation;
- Realisation of electronic components for multiplexing, de-multiplexing and modulator driving becomes increasingly difficult.

One technique which has been proposed which allows an improvement of spectral efficiency is the use of quadrature phase shift keying (QPSK) [S. Yamazaki and K. Emura (1990) "Feasibility study on QPSK optical heterodyne detection system", J. Lightwave Technol., vol. 8, pp. 1646–1653]. In optical QPSK the phase of light generated by a transmitter laser is modulated either using a single phase modulator (PM) driven by a four-level electrical signal to generate phase shifts of 0, $\pi/2$, $\pi$ or $3\pi/2$ representative of the four data states, or using two concatenated phase modulators which generate phase shifts of 0 or $\pi/2$ and $\pi$ or $3\pi/2$ respectively. A particular disadvantage of QPSK is that demodulation requires, at the demodulator, a local laser which is optically phase-locked to the transmitter laser. Typically this requires a carrier phase recovery system. For a WDM system a phase-locked laser will be required for each wavelength channel. It further requires adaptive polarisation control which, in conjunction with a phase recovery system, represents a very high degree of complexity. Furthermore, systems that require a coherent local laser are sensitive to cross-phase modulation (XPM) in the optical fibre induced by the optical Kerr non-linearity, which severely restricts the application to high capacity DWDM transmission.

It has also been proposed to use differential binary phase shift keying (DBPSK) [M. Rohde et al (2000) "Robustness of DPSK direct detection transmission format in standard fibre WDM systems", Electron. Lett., vol. 36]. In DBPSK data is encoded in the form of phase transitions of 0 or $\pi$ in which the phase value depends upon the phase of the carrier during the preceding symbol interval. A Mach-Zehnder interferometer with a delay in one arm equal to the symbol interval is used to demodulate the optical signal. Although DBPSK does not require a phase-locked laser at the receiver it does not provide any significant advantages compared to conventional amplitude NRZ signalling.

U.S. Pat. No. 6,271,950 discloses a differential phase shift keying optical transmission system, comprising a laser to generate an optical signal, a delay encoder to provide a different delay for each of M input channels and an M channel phase modulator which phase modulates the optical carrier signal with each of the differently delayed M input signal channels to form a time division multiplexed (TDM) phase modulated optical signal.

SUMMARY OF THE INVENTION

The present invention seeks to provide a monolithic encoder for use in an optical phase shift key modulator arrangement.

According to the invention there is provided a photonic integrated device having a substrate layer, epitaxial layers formed on said substrate layer and a guiding layer formed by one of the epitaxial layers, wherein an optical waveguide is formed within the guiding layer, the device further comprising in the waveguide a splitter having at least two outputs, each output being transmitted to a Mach-Zehnder modulator, the phase of the output of at least one modulator being shiftable, the signals being recombined to provide an optical phase shift key (PSK) output, wherein a trench is etched into the substrate layer between each pair of modulators to isolate the modulators from one another.

The provision of a trench etched through the epitaxial layers into the substrate layer advantageously insulates each phase modulator from its neighbour, thereby preventing any undesired RF field induced currents in the epitaxial layers and reducing the likelihood of crosstalk between the modulators.

Preferably, the waveguide between the splitter and the modulator comprises an S-curve. Preferably, the splitter comprises a 1×2 MMI and recombiner comprise a 2×2 MMI, which co-operate to provide a $\pi/2$ phase shift. Preferably, the device further comprises a control electrode adapted to provide fine control of the phase shift. Preferably the device comprises a laser, the output of which is fed to the splitter. Preferably the output power of the signal is monitored using a two photon absorption detector. Preferably a bias is applied to n doped epitaxial layers via a forward biased Schottky contact.

BRIEF DESCRIPTION OF THE DRAWINGS

An exemplary embodiment of the invention will now be described in greater detail with reference to the drawings in which.

DESCRIPTION OF ILLUSTRATED EMBODIMENT

Figure 1:
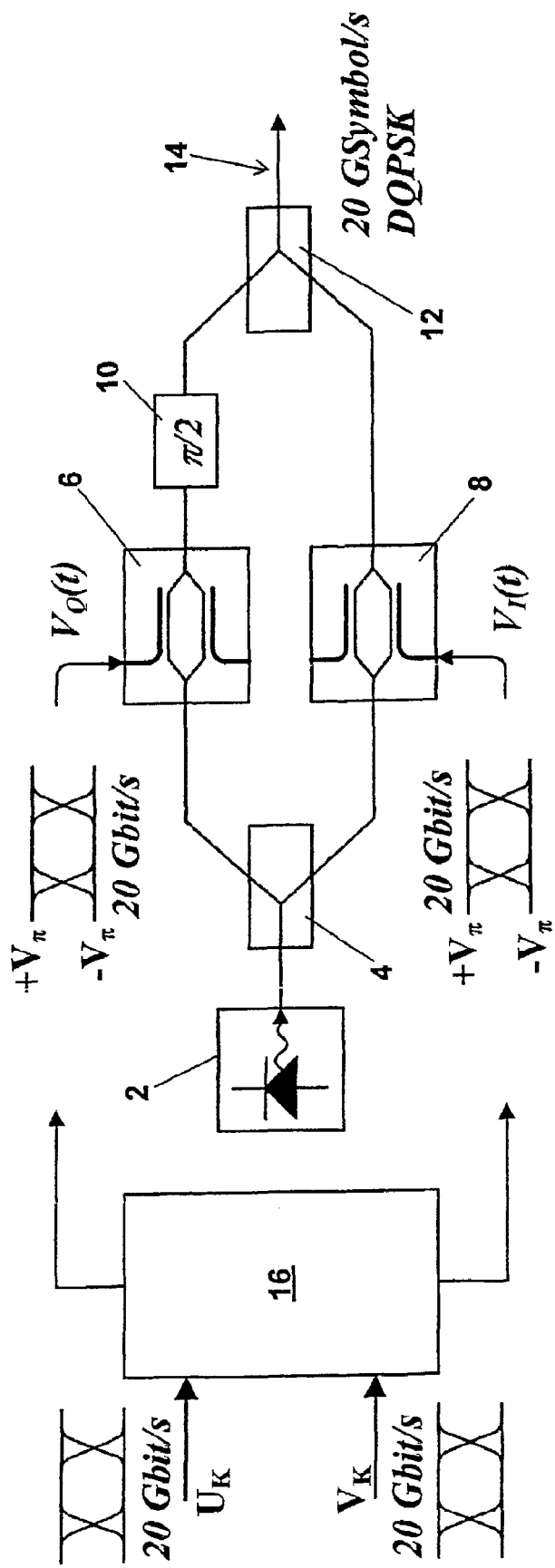
FIG. 1 shows an optical phase shift key modulator arrangement.

FIG. 1 shows an optical phase shift key modulator arrangement for encoding two 20 Gbit/s NRZ data streams $U_k$, $V_k$ onto a single optical carrier. Typically the modulator arrangement would be used as part of a transmitter in a WDM optical communications system with a respective modulator arrangement for each WDM wavelength channel.

The modulator arrangement comprises a single frequency laser 2, for example a distributed feedback (DEB) semiconductor laser due to its stable optical output for a given wavelength, which is operated to produce an unmodulated optical output of a selected wavelength, typically a WDM wavelength channel.

Light from the laser is transmitted to the integrated photonic device, where it is divided by an optical splitter 4 into two parts and each part is applied to a respective phase modulator 6, 8. Each phase modulator 6, 8 is configured such that it selectively modulates the phase by 0 or π radians in dependence upon a respective binary (bipolar) NRZ drive voltage $V_I(t)$, $V_Q(t)$. In the preferred arrangement illustrated in FIG. 1 the phase modulators 6, 8 each comprise a Mach-Zehnder electro-optic modulator (MZM). As is known MZMs are widely used as optical intensity modulators and have an optical transmission versus drive voltage characteristic, which is cyclic and is generally raised cosine in nature. The half period of the MZM's characteristic, which is measured in terms of a drive voltage, is defined as $V_\pi$. Within the modulator arrangement of the present invention each MZM 6, 8 is required to operate as a phase modulator without substantially affecting the amplitude (intensity) of the optical signal. To achieve this each MZM 6, 8 is biased for minimum optical transmission in the absence of a drive voltage and is driven with a respective drive voltage $V_I(t)$, $V_Q(t)=\pm V_\pi$ to give abrupt phase shifting with a minimum of amplitude modulation. The two phase modulators 6, 8 have matched delays (phase characteristics).

The optical output from the phase modulator 6 is passed through a phase shifter 10 which effectively applies a phase shift of π/2 such that the relative phase difference between the optical signals passing along the path containing the modulator 6 and that passing along the path containing the modulator 8 is ±π/2. The optical signals from the phase shifter 10 and phase modulator 8 are recombined by an optical recombiner 12, to form an optical phase shift key (PSK) output 14. The splitter 4 comprises a 1×2 MMI (multimode interference coupler) and recombiner 12 comprises a 2×2 MMI. The two MMIs co-operate to provide a phase difference of substantially π/2. A control electrode on top of the waveguide is then used to provide the fine control to accommodate process variation. There are of course alternative methods of obtaining a π/2 shift in one of the arms, such as using a control electrode on top of the waveguide to provide the entire shift. The MMIs are etched into the epitaxial layer, which etch is deeper than the cut for the main waveguide.

Figure 2:
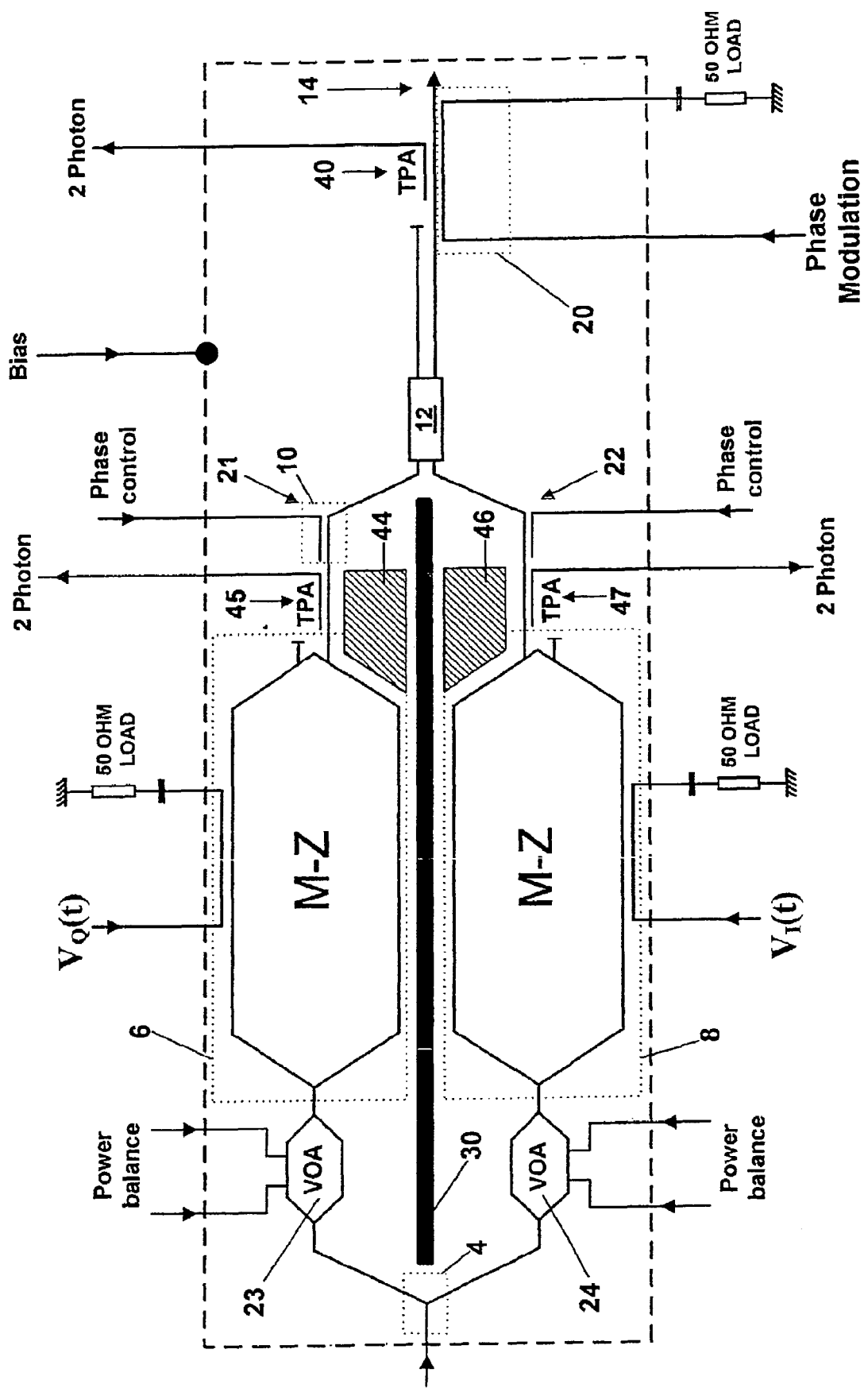
FIG. 2 shows a schematic of the device in greater detail.

FIG. 2 shows a schematic of the device in greater detail. In a first preferred aspect of the invention, the optical splitter 4, phase modulators 6 and 8, phase shifter 10, recombiner 12 and phase modulator 20 are combined on a single monolithic III–V device, in particular gallium arsenide/gallium aluminium arsenide. As the components are spatially very close, e.g. the phase modulators will typically be 2 mm apart, a trench 30 is provided between the modulators 6 and 8. The trench 30 is formed by deep etching into the substrate layer of the integrated device. The trench is applied to remove the doped epitaxial layers on the device between the modulators, which will reduce any RF induction and crosstalk effects between the modulators. In use a 15V bias is applied along the chip to deplete the upper, undoped epitaxial layers of carriers. This ensures that the electrode capacitance is minimised and is not dependent on the applied voltage and that the electro-optic efficiency is maximised. An additional effect of applying the bias is that free carriers will be removed, thereby helping to reduce optical loss. For a 2 mm separation of the modulators, a 20 dB coupling isolation is obtained, which has been shown to provide adequate isolation.

Applied to the top of the output waveguide of each modulator 6 and 8 is an electrode 21, 22 to provide fine control over the phase of the output signal. The electrode 22 could also provide the function of the phase shifter 10. Optionally, a variable optical attenuator (VOA) 23,24 can be incorporated in each arm of the device after the splitter 4 to compensate for any uneven splitting. The variable optical attenuators 23,24 comprise, in series a 1×2 MMI, two optical waveguides and a 2×1 MMI, thereby forming a Mach-Zehnder modulator with electrodes on top of each waveguide. If no bias is applied to the VOA electrodes, then there is full transmission of the optical signal.

To enable the power of the output signal to be monitored a two photon absorption (TPA) detector 40 is integrated into the device after the combiner. The TPA detector comprises an aluminium electrode forming a Schottky contact over the waveguide after the combiner. Two photon absorption is a non-resonant, non-linear optical process which occurs in semiconductor materials for photons having an energy less than the semiconductor band gap. The process occurs when an electron is excited from the valence band to an intermediate virtual state in the band gap by absorbing a first photon and is excited to the conduction band by absorbing a second photon. This generates a photocurrent which is related to the optical power in the waveguide. A particular advantage of using a TPA detector is that only a small fraction of light is absorbed and it provides directly RF power detection, obviating the necessity for a separate splitter, photodetector and RF power determining circuit, which would be used should the modulators be implemented using alternative materials such as lithium niobate. TPA detector 40 monitors the power output, additional TPA power monitoring provisions 45,47 are made at the outputs of the two Mach-Zehnder modulators 6,8.

It should be appreciated that under the device there is a continuous n-doped layer. When a +15V bias is applied to the device, it will permeate these layers and pins their potential to +15V. However, under the application of RF signals to the MZMs, currents flow in these n-doped layers which might cause crosstalk between the MZMs. Areas of aluminium 46,48 are deposited at the modulator 6, 8 output, respectively forming a capacitor in each case, which acts to decouple the RF. Metals other than aluminium, such as gold, can be used.

Figure 3:
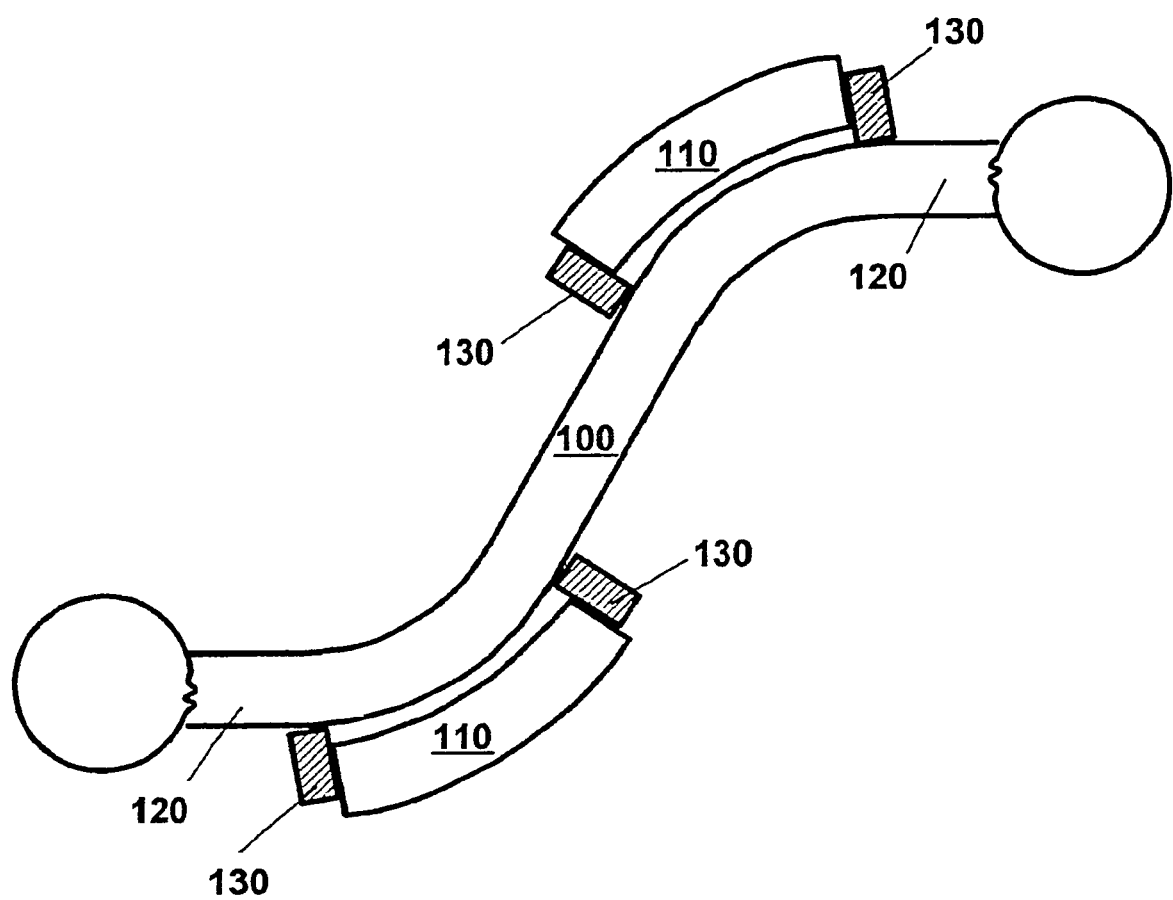
FIG. 3 shows an S curve in the optical waveguide.

FIG. 3 shows an S curve to be found in each arm of the optical waveguide between the splitter and the modulator in greater detail. A similar curve is in place between the modulator and the recombiner. The S curve 100 has a deeper etch 110 on the outside of the curve than on the inside. In production, there is a risk in production that the deeper etch will extend into the straight section of the waveguide 120, which would increase optical losses substantially. An etch stop 130 is introduced into the mask to contain this deeper etch at each end.

The phase modulator drive voltages $V_I(t)$, $V_Q(t)$ are generated by pre-coding circuitry 16 in dependence upon the two binary data streams $U_k$, $V_k$. According to the modulator arrangement of the present invention the two data streams $U_k$, $V_k$ are differentially encoded such that these data are encoded onto the optical signal 14 in the phase transitions (changes) rather than in the absolute phase value. As a result it will be appreciated that the optical signal 14 is differential quadrature phase shift key (DQPSK) encoded.

The DQPSK optical signal 14 is ideally given by $E_0 \exp(i\omega t+\theta+\theta_i)$, where $\omega$ is the mean optical angular frequency, t is time, $\theta$ the carrier phase and $\theta_i$ a data dependent phase modulation for the i-th data symbol $d_i$. In the general case $d_i \in \{0, 1, \ldots M-1\}$ and for quarternary phase shift keying M=4, that is the data symbol has four values. The phase modulation term is given by $\theta_i = \theta_{i-1} + \Delta\theta_i(d_i)$ in which $\theta_{i-1}$ is the phase term for the previous data symbol $d_{i-1}$ and $\Delta\theta_i$ the change in phase between the i-1 and i-th data symbols. The relationship between data symbol $d_i$ and phase shift $\Delta\theta_i$ for QPSK is tabulated below.

TABLE 1

Values of data $U_k$, $V_k$, data symbol $d_i$ and phase change $\Delta\theta_i(d_i)$ for DQPSK.

| $U_k$ | $V_k$ | $d_i$ | $\Delta\theta_i(d_i)$ |
|---|---|---|---|
| 0 | 0 | 0 | 0 |
| 0 | 1 | 1 | $\pi/2$ |
| 1 | 0 | 2 | $\pi$ |
| 1 | 1 | 3 | $3\pi/2$ |

It is to be noted that the mapping between data, data symbol and phase change is just one example and that other mappings can be used. The pre-coding circuitry 16 is configured such as to produce the appropriate drive voltages $V_I(t)$, $V_Q(t)$ in dependence upon the two data streams $d_1(t)$, $d_2(t)$ according to the relationships:

$$V_I(i)=V_I(i-1)\cos\Delta\theta(d_i)-V_Q(i-1)\sin\Delta\theta(d_i) \qquad \text{Eq. 1}$$

$$V_Q(i)=V_I(i-1)\sin\Delta\theta(d_i)+V_Q(i-1)\cos\Delta\theta(d_i) \qquad \text{Eq. 2}$$

Although the laser 2 has been described as being a separate component from the photonic integrated device, it would also be possible to integrate the laser into the device. Although the device has been described as having two modulators, it would be possible to provide additional modulators if corresponding amendment is made to the design of the splitter and recombiner.

The invention claimed is:

1. A photonic integrated device having a substrate layer, epitaxial layers formed on said substrate layer and a guiding layer formed by one of the epitaxial layers, wherein an optical waveguide is formed within the guiding layer, the device further comprising, in the waveguide, a splitter having at least two outputs, each output being transmitted to a Mach-Zehnder modulator, the phase of the output of at least one modulator being shiftable, the signals being recombined to provide an optical phase shift key (PSK) output, wherein a trench is etched into the substrate layer between each pair of modulators to isolate the modulators from one another.

2. The photonic integrated device according to claim 1, wherein the waveguide between the splitter and the modulator comprises an S-curve.

3. The photonic integrated device according to claim 1, wherein the splitter comprises a 1×2 MMI and the recombiner comprises a 2×2 MMI, which co-operate to provide a substantially $\pi/2$ phase shift in the output of one of the modulators.

4. The photonic integrated device according to claim 3, further comprising a control electrode adapted to provide fine control of the phase shift.

5. The photonic integrated device according to claim 1, further comprising a laser that generates an output that is fed to the splitter.

6. The photonic integrated device according to claim 1, wherein an output power of the signal is monitored with a two photon absorption detector.

7. The photonic integrated device according to claim 1, wherein a bias is applied to n-doped epitaxial layers via a forward biased Schottky contact.

8. The photonic integrated device according to claim 1, further comprising a capacitor disposed at an output of each modulator for decoupling RF.

9. The photonic integrated device according to claim 8, wherein the capacitor comprises an area of metal deposited on the surface of the device.

* * * * *